US010182317B2

(12) United States Patent
Li et al.

(10) Patent No.: US 10,182,317 B2
(45) Date of Patent: Jan. 15, 2019

(54) SIGNAL TRANSMISSION METHOD AND APPARATUS

(71) Applicant: Huawei Technologies Co., Ltd., Shenzhen (CN)

(72) Inventors: Yuanjie Li, Shanghai (CN); Ting Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 15/349,561

(22) Filed: Nov. 11, 2016

(65) Prior Publication Data

US 2017/0064519 A1 Mar. 2, 2017

Related U.S. Application Data

(63) Continuation of application No. PCT/CN2014/081575, filed on Jul. 3, 2014.

(30) Foreign Application Priority Data

May 14, 2014 (WO) ................ PCT/CN2014/077456

(51) Int. Cl.
*H04W 4/06* (2009.01)
*H04W 72/04* (2009.01)
(Continued)

(52) U.S. Cl.
CPC ............... *H04W 4/06* (2013.01); *H04L 12/18* (2013.01); *H04W 72/005* (2013.01);
(Continued)

(58) Field of Classification Search
CPC ... H04W 4/06; H04W 72/042; H04W 72/005; H04W 88/02; H04L 12/18; H04L 27/3488
See application file for complete search history.

(56) References Cited

U.S. PATENT DOCUMENTS

2007/0004415 A1 1/2007 Abedi
2010/0284319 A1 11/2010 Wang et al.
(Continued)

FOREIGN PATENT DOCUMENTS

CN 101425915 A 5/2009
CN 101465829 A 6/2009
(Continued)

OTHER PUBLICATIONS

3GPP, Correction on the ratio of PDSCH EPRE to CRS EPRE for TM10, TSG RAN WG1 Meeting #74, Barcelona, Spain, Aug. 20-24, 2013, R1-133809.*
(Continued)

*Primary Examiner* — Shailendra Kumar
(74) *Attorney, Agent, or Firm* — Leydig, Voit & Mayer, Ltd.

(57) ABSTRACT

A signal transmission method includes: performing hierarchical modulation on service data that needs to be sent, so as to obtain a hierarchically modulated signal; determining energy per resource element (EPRE) of a modulated signal of each layer of the service data according to power configuration information; and sending the hierarchically modulated signal to user equipment UE according to the determined EPRE of the modulated signal of each layer. According to the signal transmission method and apparatus provided in the embodiments of the present invention, the system spectrum utilization efficiency and the system throughput can be greatly improved.

20 Claims, 3 Drawing Sheets

(51) Int. Cl.
*H04L 12/18* (2006.01)
*H04W 72/00* (2009.01)
*H04W 88/02* (2009.01)
*H04L 27/34* (2006.01)

(52) U.S. Cl.
CPC ....... *H04W 72/042* (2013.01); *H04L 27/3488* (2013.01); *H04W 88/02* (2013.01)

(56) References Cited

U.S. PATENT DOCUMENTS

| | | | |
|---|---|---|---|
| 2012/0213186 A1 | | 8/2012 | Ng et al. |
| 2012/0257562 A1 | | 10/2012 | Kim et al. |
| 2013/0128796 A1 | | 5/2013 | Newberg et al. |
| 2014/0198707 A1 | | 7/2014 | Wang et al. |
| 2014/0321345 A1 | * | 10/2014 | Li .................... H04W 52/143 370/311 |
| 2015/0230210 A1 | * | 8/2015 | Lee .................... H04L 5/0048 370/329 |

FOREIGN PATENT DOCUMENTS

| | | | |
|---|---|---|---|
| CN | 101707584 A | | 5/2010 |
| CN | 102036184 A | | 4/2011 |
| CN | 102104833 A | * | 6/2011 |
| CN | 102957498 A | * | 3/2013 |
| CN | 103001756 A | | 3/2013 |
| CN | 103178870 A | | 6/2013 |
| EP | 2811793 A1 | | 12/2014 |
| JP | 2010527526 A | | 8/2010 |
| JP | 2010219949 A | | 9/2010 |
| JP | 2011019273 A | | 1/2011 |
| JP | 2013509739 A | | 3/2013 |
| JP | 2013509741 A | | 3/2013 |
| WO | WO 2011026235 A1 | | 3/2011 |
| WO | WO 2013113151 A1 | | 8/2013 |
| WO | 2013139036 A1 | | 9/2013 |

OTHER PUBLICATIONS

"Supporting Differentiated Quality in Mobile Multimedia Devices using Scalable MBMS," 3PP Joint TSG-RAN WG2 and WG3 MBMS Meeting, Wokingham, Berkshire, Tdoc R2-030055, pp. 1-8, 3$^{rd}$ Generation Partnership Project, Valbonne, France (Jan. 15-16, 2003).

"3$^{rd}$ Generation Partnership Project; Technical Specification Group Radio Access Network; Evolved Universal Terrestrial Radio Access (E-UTRA); Physical layer procedures (Release 12)," 3GPP TS 36.213, pp. 1-186, 3$^{rd}$ Generation Partnership Project, Valbonne, France (Mar. 2014).

"Hierarchical Modulation based DL MIMO for LTE-Advanced," 3GPP TSG-RAN1 #58bis, R1-094250, 3$^{rd}$ Generation Partnership Project, Valbonne, France (Oct. 12-16, 2009).

"Introduction of Rel-12 LTE-Advanced features in 36.213," 3GPP Draft, R1-141736, 3$^{rd}$ Generation Partnership Project, Valbonne, France (Mar. 31-Apr. 4, 2014).

Morimoto et al., "A Study on a Hierarchical Image Transmission System in a Rayleigh Fading Channel," Technical report of the Institute of Electronics, Information and Communication Engineers vol. 96, No. 49, RCS96-22, pp. 33-38, IEICE, (May 1996).

"Correction on the ratio of PDSCH EPRE to CRS EPRE for TM10," 3GPP TSG-RAN WG1 Meeting #74 Barcelona, Spain, R1-133809, pp. 2-3, 3rd Generation Partnership Project, Valbonne, France (Aug. 20-24, 2013).

"Details of CQI definition for LTE-A," 3GPP TSG-RAN WG1 #63 Jacksonville, USA, R1-106034, pp. 2-9, 3rd Generation Partnership Project, Valbonne, France (Nov. 15-19, 2010).

"MBMS Power Usage," 3GPP TSG RAN WG2 #31, Stockholm, Sweden, R2-022110, 3rd Generation Partnership Project, Valbonne, France (Aug. 18-23, 2002).

* cited by examiner

SIGNAL TRANSMISSION METHOD AND APPARATUS

ROSS-REFERENCE TO RELATED APPLICATIONS

This application is a continuation of International Application No. PCT/CN2014/081575, filed on Jul. 3, 2014, which claims priority to International Application No. PCT/CN2014/077456, filed on May 14, 2014. The disclosures of the aforementioned applications are hereby incorporated by reference in their entireties.

TECHNICAL FIELD

The embodiments of the present invention relates to the field of communications technologies, and in particular, to a signal transmission method and apparatus.

BACKGROUND

An MBMS (Multimedia Broadcast Multicast Service) is used to provide a multimedia broadcast service and a multimedia multicast service for user equipment (UE) in a cell. The multimedia broadcast service may broadcast multimedia video information to all UEs, and the multimedia multicast service may send some paid multimedia video information to a group of subscribed UEs for watching.

In an LTE (Long Term Evolution) system, when an MBMS mode is used to transmit a physical multicast channel (PMCH), a network side device needs to modulate, according to a preset modulation scheme, a PMCH that needs to be transmitted, so as to obtain a modulated signal, and sends the modulated signal according to preset transmit power. After receiving the modulated signal, UE needs to decode, according to configuration information such as the preset transmit power, the received modulated signal.

Because a channel environment quality between cell edge UE and a base station is relatively poor (a signal-to-noise ratio is relatively low), a low-order modulation scheme, for example, Quadrature Phase Shift Keying (QPSK), needs to be used when service data is transmitted to the cell edge UE, so as to ensure robustness of service transmission. Because a channel environment quality between cell center UE and the base station is relatively high (the signal-to-noise ratio is relatively high), a high-order modulation scheme, for example, 16 QAM or 64 QAM, may be used when service data is transmitted to the cell center UE, so as to increase a bit rate of signal transmission. In the LTE system, when MBMS data is broadcast to all UEs in the cell, only a low-order modulation scheme can be selected, so as to ensure that the cell center UE and the cell edge UE can both receive the MBMS data. As a result, an overall system throughput is reduced, which results in relatively low system spectrum utilization efficiency.

SUMMARY

The embodiments of the present invention provide a signal transmission method and apparatus, to resolve a problem that a signal transmission manner of an LTE system causes relatively low system spectrum utilization efficiency and a relatively low system throughput.

According to a first aspect, a signal transmission apparatus is provided, including:

a modulation module, configured to perform hierarchical modulation on service data that needs to be sent, so as to obtain a hierarchically modulated signal;

a determining module, configured to determine energy per resource element (EPRE) of a modulated signal of each layer according to power configuration information of the hierarchical modulation; and a sending module, configured to send the hierarchically modulated signal to user equipment UE according to the EPRE, determined by the determining module, of the modulated signal of each layer.

With reference to the first aspect, in a first possible implementation manner, the service data includes base-layer data and additional-layer data, where a priority of the base-layer data is higher than a priority of the additional-layer data; and the hierarchical modulation includes base-layer modulation and additional-layer modulation, where the base-layer modulation is modulation performed on the base-layer data of the service data, and the additional-layer modulation is modulation performed on the additional-layer data of the service data.

With reference to the first aspect, or the first possible implementation manner of the first aspect, in a second possible implementation manner, the power configuration information includes:

a ratio of EPRE of the hierarchically modulated signal to EPRE of a reference signal (RS) on a Multimedia Broadcast multicast service Single Frequency Network (MBSFN); or a ratio of EPRE of a base-layer modulated signal to EPRE of an RS on an MBSFN; or a ratio of EPRE of an additional-layer modulated signal to EPRE of an RS on an MBSFN.

With reference to the second possible implementation manner of the first aspect, in a third possible implementation manner, the power configuration information includes:

the ratio of the EPRE of the hierarchically modulated signal to the EPRE of the RS on the MBSFN is 0 dB; or the ratio of the EPRE of the base-layer modulated signal to the EPRE of the RS on the MBSFN is 0 dB; or the ratio of the EPRE of the additional-layer modulated signal to the EPRE of the RS on the MBSFN is 0 dB.

With reference to the second or the third possible implementation manner of the first aspect, in a fourth possible implementation manner, the power configuration information further includes:

any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

With reference to the first aspect, or the first possible implementation manner of the first aspect, in a fifth possible implementation manner, the power configuration information includes:

a ratio of each of EPRE of a base-layer modulated signal and EPRE of an additional-layer modulated signal to EPRE of an RS on an MBSFN.

With reference to any one of the first aspect, or the first to the fifth possible implementation manners of the first aspect, in a sixth possible implementation manner, the sending module is further configured to:

configure the power configuration information of the hierarchical modulation, and send the power configuration information of the hierarchical modulation to the UE.

With reference to the sixth possible implementation manner of the first aspect, in a seventh possible implementation manner, the sending module is specifically configured to:

send the power configuration information to the UE by using a broadcast control channel (BCCH); or send the power configuration information to the UE by using a multicast control channel (MCCH); or send the power configuration information to the UE by using a physical downlink control channel (PDCCH) or an enhanced physical downlink control channel (EPDCCH).

According to a second aspect, a signal transmission apparatus is provided, including:

a receiving module, configured to receive a hierarchically modulated signal sent by a network side device, where the hierarchically modulated signal is a signal obtained after hierarchical modulation is performed on service data; and a determining module, configured to determine, according to power configuration information, energy per resource element (EPRE) of a modulated signal of each layer, where the EPRE is required for performing decoding on the hierarchically modulated signal received by the receiving module.

With reference to the second aspect, in a first possible implementation manner, the service data includes base-layer data and additional-layer data, where a priority of the base-layer data is higher than a priority of the additional-layer data; and the hierarchical modulation includes base-layer modulation and additional-layer modulation, where the base-layer modulation is modulation performed on the base-layer data of the service data, and the additional-layer modulation is modulation performed on the additional-layer data of the service data.

With reference to the second aspect, or the first possible implementation manner of the second aspect, in a second possible implementation manner, the power configuration information includes:

a ratio of EPRE of the hierarchically modulated signal to EPRE of a reference signal (RS) on a Multimedia Broadcast multicast service Single Frequency Network (MBSFN); or a ratio of EPRE of a base-layer modulated signal to EPRE of an RS on an MBSFN; or a ratio of EPRE of an additional-layer modulated signal to EPRE of an RS on an MBSFN.

With reference to the second possible implementation manner of the second aspect, in a third possible implementation manner, the power configuration information includes:

the ratio of the EPRE of the hierarchically modulated signal to the EPRE of the RS on the MBSFN is 0 dB; or the ratio of the EPRE of the base-layer modulated signal to the EPRE of the RS on the MBSFN is 0 dB; or the ratio of the EPRE of the additional-layer modulated signal to the EPRE of the RS on the MBSFN is 0 dB.

With reference to the second or the third possible implementation manner of the second aspect, in a fourth possible implementation manner, the power configuration information further includes:

any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

With reference to the second aspect, or the first possible implementation manner of the second aspect, in a fifth possible implementation manner, the power configuration information includes: a ratio of each of EPRE of a base-layer modulated signal and EPRE of an additional-layer modulated signal to EPRE of an RS on an MBSFN.

With reference to any one of the second aspect, or the first to the fifth possible implementation manners of the second aspect, in a sixth possible implementation manner, the determining module is specifically configured to:

determine the EPRE of the modulated signal of each layer according to preset power configuration information; or receive power configuration information sent by the network side device, and determine the EPRE of the modulated signal of each layer according to the received power configuration information.

With reference to the sixth possible implementation manner of the second aspect, in a seventh possible implementation manner, the receiving module is specifically configured to: receive the power configuration information by using a broadcast control channel (BCCH); or receive the power configuration information by using a multicast control channel (MCCH); or receive the power configuration information by using a physical downlink control channel (PDCCH) or an enhanced physical downlink control channel (EPDCCH).

According to a third aspect, a signal transmission apparatus is provided, including a processor, a memory, and a bus, where the memory stores an execution instruction; when the apparatus runs, the processor communicates with the memory by using the bus, and the processor executes the execution instruction, so that the apparatus executes the following method:

performing hierarchical modulation on service data that needs to be sent, so as to obtain a hierarchically modulated signal;

determining energy per resource element (EPRE) of a modulated signal of each layer according to power configuration information of the hierarchical modulation; and sending the hierarchically modulated signal to user equipment UE according to the determined EPRE of the modulated signal of each layer.

With reference to the third aspect, in a first possible implementation manner, the service data includes base-layer data and additional-layer data, where a priority of the base-layer data is higher than a priority of the additional-layer data; and the hierarchical modulation includes base-layer modulation and additional-layer modulation, where the base-layer modulation is modulation performed on the base-layer data of the service data, and the additional-layer modulation is modulation performed on the additional-layer data of the service data.

With reference to the third aspect, or the first possible implementation manner of the third aspect, in a second possible implementation manner, the power configuration information includes:

a ratio of EPRE of the hierarchically modulated signal to EPRE of a reference signal (RS) on a Multimedia Broadcast multicast service Single Frequency Network (MBSFN); or a ratio of EPRE of a base-layer modulated signal to EPRE of an RS on an MBSFN; or a ratio of EPRE of an additional-layer modulated signal to EPRE of an RS on an MBSFN.

With reference to the second possible implementation manner of the third aspect, in a third possible implementation manner, the power configuration information includes:

the ratio of the EPRE of the hierarchically modulated signal to the EPRE of the RS on the MBSFN is 0 dB; or the ratio of the EPRE of the base-layer modulated signal to the EPRE of the RS on the MBSFN is 0 dB; or the ratio of the EPRE of the additional-layer modulated signal to the EPRE of the RS on the MBSFN is 0 dB.

With reference to the second or the third possible implementation manner of the third aspect, in a fourth possible implementation manner, the power configuration information further includes:

any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

With reference to the third aspect, or the first possible implementation manner of the third aspect, in a fifth possible implementation manner, the power configuration information includes:

a ratio of each of EPRE of a base-layer modulated signal and EPRE of an additional-layer modulated signal to EPRE of an RS on an MBSFN.

With reference to any one of the third aspect, or the first to the fifth possible implementation manners of the third aspect, in a sixth possible implementation manner, the method executed by the processor further includes:

configuring the power configuration information of the hierarchical modulation; and sending the power configuration information of the hierarchical modulation to the UE.

With reference to the sixth possible implementation manner of the third aspect, in a seventh possible implementation manner, in the method executed by the processor, the sending the power configuration information of the hierarchical modulation to the UE includes:

sending the power configuration information to the UE by using a broadcast control channel (BCCH); or sending the power configuration information to the UE by using a multicast control channel (MCCH); or sending the power configuration information to the UE by using a physical downlink control channel (PDCCH) or an enhanced physical downlink control channel (EPDCCH).

According to a fourth aspect, a signal transmission apparatus is provided, including a processor, a memory, and a bus, where the memory stores an execution instruction; when the apparatus runs, the processor communicates with the memory by using the bus, and the processor executes the execution instruction, so that the apparatus executes the following method:

receiving a hierarchically modulated signal sent by a network side device, where the hierarchically modulated signal is a signal obtained after hierarchical modulation is performed on service data; and determining, according to power configuration information, energy per resource element (EPRE) of a modulated signal of each layer, where the EPRE is required for performing decoding on the hierarchically modulated signal.

With reference to the fourth aspect, in a first possible implementation manner, the service data includes base-layer data and additional-layer data, where a priority of the base-layer data is higher than a priority of the additional-layer data; and the hierarchical modulation includes base-layer modulation and additional-layer modulation, where the base-layer modulation is modulation performed on the base-layer data of the service data, and the additional-layer modulation is modulation performed on the additional-layer data of the service data.

With reference to the fourth aspect, or the first possible implementation manner of the fourth aspect, in a second possible implementation manner, the power configuration information includes:

a ratio of EPRE of the hierarchically modulated signal to EPRE of a reference signal (RS) on a Multimedia Broadcast multicast service Single Frequency Network (MBSFN); or a ratio of EPRE of a base-layer modulated signal to EPRE of an RS on an MBSFN; or a ratio of EPRE of an additional-layer modulated signal to EPRE of an RS on an MBSFN.

With reference to the second possible implementation manner of the fourth aspect, in a third possible implementation manner, the power configuration information includes:

the ratio of the EPRE of the hierarchically modulated signal to the EPRE of the RS on the MBSFN is 0 dB; or the ratio of the EPRE of the base-layer modulated signal to the EPRE of the RS on the MBSFN is 0 dB; or the ratio of the EPRE of the additional-layer modulated signal to the EPRE of the RS on the MBSFN is 0 dB.

With reference to the second or the third possible implementation manner of the fourth aspect, in a fourth possible implementation manner, the power configuration information further includes:

any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

With reference to the fourth aspect, or the first possible implementation manner of the fourth aspect, in a fifth possible implementation manner, the power configuration information includes: a ratio of each of EPRE of a base-layer modulated signal and EPRE of an additional-layer modulated signal to EPRE of an RS on an MBSFN.

With reference to any one of the fourth aspect, or the first to the fifth possible implementation manners of the fourth aspect, in a sixth possible implementation manner, in the method executed by the processor, the determining, according to power configuration information, EPRE of a modulated signal of each layer, where the EPRE is required for performing decoding on the hierarchically modulated signal includes:

determining the EPRE of the modulated signal of each layer according to preset power configuration information;

or receiving power configuration information sent by the network side device, and determining the EPRE of the modulated signal of each layer according to the received power configuration information.

With reference to the sixth possible implementation manner of the fourth aspect, in a seventh possible implementation manner, in the method executed by the processor, the receiving power configuration information sent by the network side device includes:

receiving the power configuration information by using a broadcast control channel (BCCH); or receiving the power configuration information by using a multicast control channel (MCCH); or receiving the power configuration information by using a physical downlink control channel (PDCCH) or an enhanced physical downlink control channel (EPDCCH).

According to a fifth aspect, a signal transmission method is provided, including:

performing hierarchical modulation on service data that needs to be sent, so as to obtain a hierarchically modulated signal;

determining energy per resource element (EPRE) of a modulated signal of each layer according to power configuration information of the hierarchical modulation; and sending the hierarchically modulated signal to user equipment UE according to the determined EPRE of the modulated signal of each layer.

With reference to the fifth aspect, in a first possible implementation manner, the service data includes base-layer data and additional-layer data, where a priority of the base-layer data is higher than a priority of the additional-layer data; and the hierarchical modulation includes base-layer modulation and additional-layer modulation, where the base-layer modulation is modulation performed on the base-layer data of the service data, and the additional-layer modulation is modulation performed on the additional-layer data of the service data.

With reference to the fifth aspect, or the first possible implementation manner of the fifth aspect, in a second possible implementation manner, the power configuration information includes:

a ratio of EPRE of the hierarchically modulated signal to EPRE of a reference signal (RS) on a Multimedia Broadcast multicast service Single Frequency Network (MBSFN); or a ratio of EPRE of a base-layer modulated signal to EPRE of an RS on an MBSFN; or a ratio of EPRE of an additional-layer modulated signal to EPRE of an RS on an MBSFN.

With reference to the second possible implementation manner of the fifth aspect, in a third possible implementation manner, the power configuration information includes:

the ratio of the EPRE of the hierarchically modulated signal to the EPRE of the RS on the MBSFN is 0 dB; or the ratio of the EPRE of the base-layer modulated signal to the EPRE of the RS on the MBSFN is 0 dB; or the ratio of the EPRE of the additional-layer modulated signal to the EPRE of the RS on the MBSFN is 0 dB.

With reference to the second or the third possible implementation manner of the fifth aspect, in a fourth possible implementation manner, the power configuration information further includes:

any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

With reference to the fifth aspect, or the first possible implementation manner of the fifth aspect, in a fifth possible implementation manner, the power configuration information includes:

a ratio of each of EPRE of a base-layer modulated signal and EPRE of an additional-layer modulated signal to EPRE of an RS on an MBSFN.

With reference to any one of the fifth aspect, or the first to the fifth possible implementation manners of the fifth aspect, in a sixth possible implementation manner, the method further includes:

configuring the power configuration information of the hierarchical modulation; and sending the power configuration information of the hierarchical modulation to the UE.

With reference to the sixth possible implementation manner of the fifth aspect, in a seventh possible implementation manner, the sending the power configuration information of the hierarchical modulation to the UE includes:

sending the power configuration information to the UE by using a broadcast control channel (BCCH); or sending the power configuration information to the UE by using a multicast control channel (MCCH); or sending the power configuration information to the UE by using a physical downlink control channel (PDCCH) or an enhanced physical downlink control channel (EPDCCH).

According to a sixth aspect, a signal transmission method is provided, including:

receiving a hierarchically modulated signal sent by a network side device, where the hierarchically modulated signal is a signal obtained after hierarchical modulation is performed on service data; and determining, according to power configuration information, energy per resource element (EPRE) of a modulated signal of each layer, where the EPRE is required for performing decoding on the hierarchically modulated signal.

With reference to the sixth aspect, in a first possible implementation manner, the service data includes base-layer data and additional-layer data, where a priority of the base-layer data is higher than a priority of the additional-layer data; and the hierarchical modulation includes base-layer modulation and additional-layer modulation, where the base-layer modulation is modulation performed on the base-layer data of the service data, and the additional-layer modulation is modulation performed on the additional-layer data of the service data.

With reference to the sixth aspect, or the first possible implementation manner of the sixth aspect, in a second possible implementation manner, the power configuration information includes:

a ratio of EPRE of the hierarchically modulated signal to EPRE of a reference signal (RS) on a Multimedia Broadcast multicast service Single Frequency Network (MBSFN); or a ratio of EPRE of a base-layer modulated signal to EPRE of an RS on an MBSFN; or a ratio of EPRE of an additional-layer modulated signal to EPRE of an RS on an MBSFN.

With reference to the second possible implementation manner of the sixth aspect, in a third possible implementation manner, the power configuration information includes:

the ratio of the EPRE of the hierarchically modulated signal to the EPRE of the RS on the MBSFN is 0 dB; or the ratio of the EPRE of the base-layer modulated signal to the EPRE of the RS on the MBSFN is 0 dB; or the ratio of the EPRE of the additional-layer modulated signal to the EPRE of the RS on the MBSFN is 0 dB.

With reference to the second or the third possible implementation manner of the sixth aspect, in a fourth possible implementation manner, the power configuration information further includes:

any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

With reference to the sixth aspect, or the first possible implementation manner of the sixth aspect, in a fifth possible implementation manner, the power configuration information includes: a ratio of each of EPRE of a base-layer modulated signal and EPRE of an additional-layer modulated signal to EPRE of an RS on an MBSFN.

With reference to any one of the sixth aspect, or the first to the fifth possible implementation manners of the sixth aspect, in a sixth possible implementation manner, the determining, according to power configuration information, EPRE of a modulated signal of each layer, where the EPRE is required for performing decoding on the hierarchically modulated signal includes:

determining the EPRE of the modulated signal of each layer according to preset power configuration information; or receiving power configuration information sent by the network side device, and determining the EPRE of the modulated signal of each layer according to the received power configuration information.

With reference to the sixth possible implementation manner of the sixth aspect, in a seventh possible implementation manner, the receiving power configuration information sent by the network side device includes:

receiving the power configuration information by using a broadcast control channel (BCCH); or receiving the power configuration information by using a multicast control channel (MCCH); or receiving the power configuration information by using a physical downlink control channel (PDCCH) or an enhanced physical downlink control channel (EPDCCH).

BRIEF DESCRIPTION OF DRAWINGS

To better describe the technical solutions in the embodiments of the present invention, the following briefly describes the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
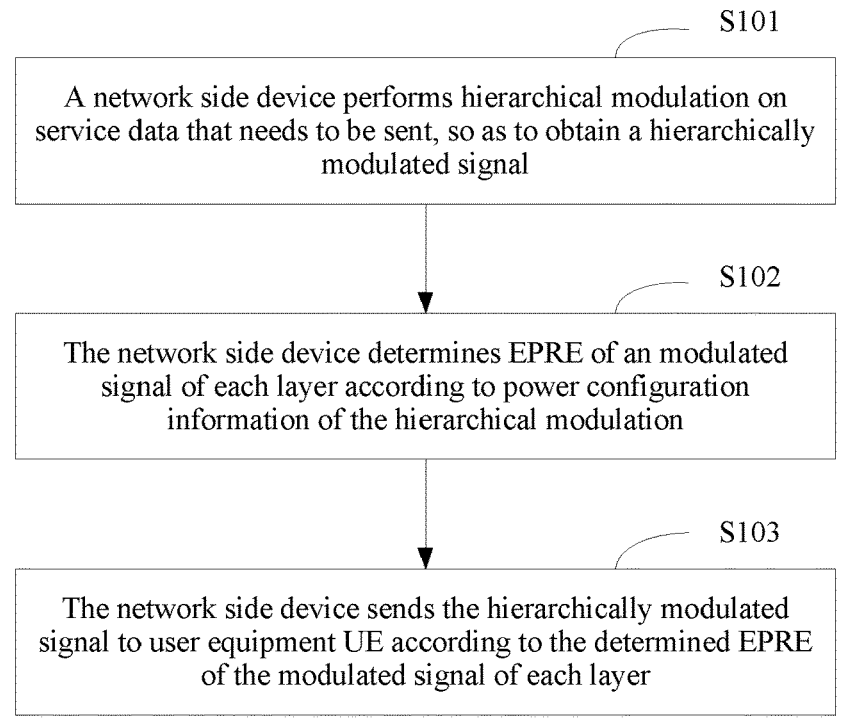
FIG. 1 is a flowchart of a signal transmission method according to Embodiment 1 of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the embodiments of the present invention, a network side device may perform hierarchical modulation on service data that needs to be sent to UE, so as to obtain a hierarchically modulated signal; determine energy per resource element (EPRE) of a modulated signal of each layer according to power configuration information; and send the hierarchically modulated signal to the UE according to the determined EPRE of the modulated signal of each layer. The hierarchical modulation may also be referred to as embedded modulation, multi-resolution modulation, asymmetrical modulation, and non-uniform modulation, and a basic idea thereof is mapping data that has different quality of service (QoS) to a different layer.

Using this hierarchical modulation scheme may provide different UEs with different MBMS data. For example, when MBMS data is sent to cell center UE and cell edge UE, high-priority data may be modulated by using base-layer modulation (for example, QPSK) of the hierarchical modulation, and low-priority data may be modulated by using additional-layer modulation (for example, 16 QAM) of the hierarchical modulation. In this way, both cell center UE having a relatively good channel condition and cell edge UE having a relatively poor channel condition can correctly obtain the high-priority data by demodulation from the hierarchically modulated signal; in addition, the cell center UE having the relatively good channel condition can correctly demodulate the low-priority data from the hierarchically modulated signal. Herein, operating points required by data having different priorities to reach a same target block error rate (BLER) are different. The high-priority data needs to be strictly protected. Specifically, A required target BLER (for example, a 1% BLER) needs to be achieved in a case with a relatively low signal to interference plus noise ratio (SINR). A protection degree required by the low-priority data is relatively low. Specifically, A required target BLER (for example, a 1% BLER) needs to be achieved in a case with a relatively high SINR. Alternatively, a data service supported by the high-priority data requires a relatively large coverage area, for example, a service broadcast by the China Central Television to the whole country; a data service supported by the low-priority data requires a relatively small coverage area, for example, a service of a local radio station. This manner can greatly improve system spectrum utilization efficiency and a system throughput.

The embodiments of the present invention may not only be applied to transmission of the foregoing MBMS service, but also be applied to transmission of a unicast service. In transmission of the unicast service, modulation of a different layer may be separately used to modulate different unicast service data, where the different unicast service data includes high-priority data and low-priority data, the high-priority data needs to be allocated to UE having a relatively poor channel condition (for example, cell edge UE), and low-priority unicast service data needs to be allocated to UE having a relatively good channel condition (for example, cell center UE). After a hierarchically modulated signal is transmitted to UEs having different channel conditions, each UE may obtain, by demodulation from the hierarchically modulated signal, unicast service data that belongs to the UE itself.

The following further describes the embodiments of the present invention in detail with reference to accompanying drawings in this specification.

FIG. 1 is a flowchart of a signal transmission method according to Embodiment 1 of the present invention, including:

S101. A network side device performs hierarchical modulation on service data that needs to be sent, so as to obtain a hierarchically modulated signal.

S102. The network side device determines energy per resource element (EPRE) of a modulated signal of each layer according to power configuration information of the hierarchical modulation.

S103. The network side device sends the hierarchically modulated signal to user equipment UE according to the determined EPRE of the modulated signal of each layer.

In this embodiment of the present invention, the network side device may be specifically an evolved Node B (eNB) in an LTE system. For the hierarchical modulation, the service data transmitted by the network side device includes base-layer data and additional-layer data, where a priority of the base-layer data is higher than a priority of the additional-layer data (that is, a protection degree required by the base-layer data is higher than a protection degree required by the additional-layer data). The hierarchical modulation includes base-layer modulation and additional-layer modulation, where the base-layer modulation is modulation performed on the base-layer data of the service data, and the additional-layer modulation is modulation performed on the additional-layer data of the service data, that is, a priority of a base-layer modulated signal is higher than a priority of an additional-layer modulated signal.

Figure 2:
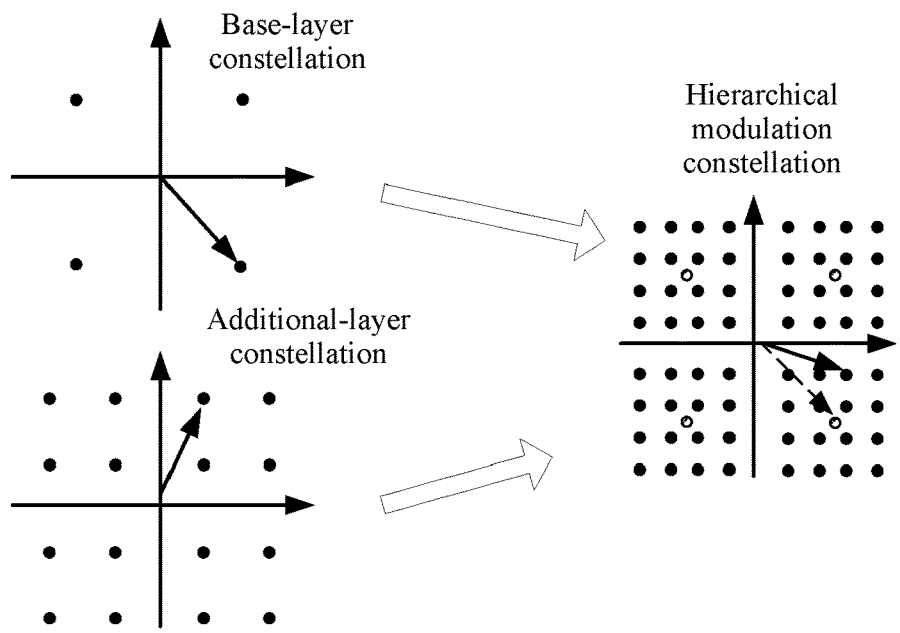
FIG. 2 is a schematic diagram of a constellation of hierarchical modulation.

In an application scenario, for a same MBMS service, a hierarchical modulation scheme may be used if the network side device needs to provide services of different quality for different UEs in a cell. For example, when providing an MBMS video service for UEs in a cell, the network side device may determine to use the hierarchical modulation scheme to modulate common video data and supplementary video data corresponding to a high-definition video, so as to satisfy a requirement for watching a video simultaneously by cell center UE and cell edge UE and a requirement for providing the high-definition video for the cell center UE or UE having a relatively good channel condition. Specifically, the base-layer modulation (for example, QPSK) of the hierarchical modulation may be used to modulate the common video data, and the additional-layer modulation (for example, 16 QAM) of the hierarchical modulation may be used to modulate the supplementary video data. FIG. 2 is a schematic diagram of a constellation of hierarchical modulation. As shown in this figure, a QPSK-based base-layer constellation and a 16 QAM-based additional-layer constellation are combined to obtain a 64 QAM-based hierarchical modulation constellation. In this way, cell edge UE or UE having a relatively poor channel condition may obtain common video data by demodulation from a received hierarchically modulated signal, and watches a common video by means of the common video data, while cell center UE or UE having a relatively good channel condition may obtain common video data by demodulation from the received hierarchically modulated signal, and may further obtain supplementary video data by demodulation, and watches a high-definition video by means of the two types of video data.

In another application scenario, when providing unicast service data for different UEs, the network side device may also choose to use the hierarchical modulation scheme. Specifically, the base-layer modulation and the additional-layer modulation are separately used to modulate unicast service data sent to the different UEs. For unicast service data sent to cell edge UE or UE having a poor channel condition, the base-layer modulation may be used to ensure data transmission robustness; for unicast service data sent to cell center UE or UE having a good channel condition, the additional-layer modulation may be used to improve data transmission efficiency. In this way, each UE not only can obtain base-layer or additional-layer unicast service data belonging to the UE itself, but also can improve a system throughput and spectrum utilization efficiency.

In a specific implementation process, the network side device needs to determine EPRE of the hierarchically modulated signal, and sends the hierarchically modulated signal according to the EPRE of the hierarchically modulated signal. The network side device may determine the EPRE of the hierarchically modulated signal according to preset power configuration information in a protocol or power configuration information configured by the network side device. A form of the power configuration information may be specifically the following.

First form: The power configuration information includes a ratio of EPRE of the hierarchically modulated signal to EPRE of a reference signal (RS) on a Multimedia Broadcast multicast service Single Frequency Network (MBSFN), or a ratio of EPRE of the base-layer modulated signal to the EPRE of the RS on the MBSFN, or a ratio of EPRE of the additional-layer modulated signal to the EPRE of the RS on the MBSFN.

In this implementation manner, the EPRE of the RS on the MBSFN is known; the EPRE of the hierarchically modulated signal may be determined according to the ratio of the EPRE of the hierarchically modulated signal to the EPRE of the RS on the MBSFN, and then the EPRE of the modulated signal of each layer may be determined with reference to a scaling factor $\alpha$. Likewise, the EPRE of the base-layer modulated signal may be determined according to the ratio of the EPRE of the base-layer modulated signal to the EPRE of the RS on the MBSFN, and then the EPRE of the additional-layer modulated signal may be determined with reference to the scaling factor $\alpha$; the EPRE of the additional-layer modulated signal may be determined according to the ratio of the EPRE of the additional-layer modulated signal to the EPRE of the RS on the MBSFN, and then the EPRE of the base-layer modulated signal may be determined with reference to the scaling factor α.

The scaling factor α herein may belong to the foregoing power configuration information, or may be independent from the power configuration information. The scaling factor α may be specifically any one of the following ratios:

any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

Herein, the foregoing ratio of the base-layer constellation point spacing to the hierarchical modulation constellation point spacing, the ratio of the additional-layer constellation point spacing to the hierarchical modulation constellation point spacing, and the ratio of the base-layer constellation point spacing to the additional-layer constellation point spacing are referred to as constellation point spacing ratios for short, and the constellation point spacing herein indicates a minimum distance between constellation points. The ratio of the EPRE of the base-layer modulated signal to the EPRE of the hierarchically modulated signal, the ratio of the EPRE of the additional-layer modulated signal to the EPRE of the hierarchically modulated signal, and the ratio of the EPRE of the base-layer modulated signal to the EPRE of the additional-layer modulated signal are referred to as energy ratios for short. The foregoing constellation point spacing ratios and energy ratios are in a correspondence, and the energy ratios may be determined according to the constellation point spacing ratios. For example, for hierarchical modulation with a base layer using a QPSK modulation scheme and an additional layer using a QPSK modulation scheme, when the scaling factor is the ratio of the base-layer constellation point spacing to the hierarchical modulation constellation point spacing, the ratio of the EPRE of the base-layer modulated signal to the EPRE of the additional-layer modulated signal is: $(a+1)^2$. For another example, for hierarchical modulation with the base layer using the QPSK modulation scheme and the additional layer using a 16-QAM modulation scheme, when the scaling factor is the ratio of the base-layer constellation point spacing to the hierarchical modulation constellation point spacing, the ratio of the EPRE of the base-layer modulated signal to the EPRE of the additional-layer modulated signal is: $5 \times (a+1)^2$. For another example, for hierarchical modulation with the base layer using the 16-QAM modulation scheme and the additional layer using the QPSK modulation scheme, when the scaling factor is the ratio of the base-layer constellation point spacing to the hierarchical modulation constellation point spacing, the ratio of the EPRE of the base-layer modulated signal to the EPRE of the additional-layer modulated signal is: $[8 \times (a+1)^2]/[a^2+(a+2)^2]$.

In this manner, the ratio of the EPRE of the hierarchically modulated signal to the EPRE of the RS on the MBSFN may be 0 dB, that is, the EPRE of the hierarchically modulated signal may be configured as being equal to the EPRE of the RS on the MBSFN; or, the ratio of the EPRE of the base-layer modulated signal to the EPRE of the RS on the MBSFN may be 0 dB, that is, the EPRE of the base-layer modulated signal may be configured as being equal to the EPRE of the RS on the MBSFN; or, the ratio of the EPRE of the additional-layer modulated signal to the EPRE of the RS on the MBSFN may be 0 dB, that is, the EPRE of the additional-layer modulated signal may be configured as being equal to the EPRE of the RS on the MBSFN.

The foregoing power configuration information includes the ratio of only one of the EPRE of the hierarchically modulated signal, the EPRE of the base-layer modulated signal, and the EPRE of the additional-layer modulated signal to the EPRE of the RS on the MBSFN. The network side device needs to obtain the EPRE of the modulated signal of each layer with reference to the scaling factor α. Herein, the scaling factor α is a mandatory parameter required by the network side device for performing modulation on the hierarchically modulated signal. Therefore, a network side needs to store a value of the scaling factor α regardless of whether reference needs to be made to the scaling factor α to obtain the EPRE of the modulated signal of each layer.

In the foregoing implementation manner, the power configuration information may be preset in a protocol, or configured by the network side device. No matter whether the power configuration information is preset in a protocol or configured by the network side device, the network side device needs to store the preset power configuration information or the power configuration information configured by the network side device, when needing to send the hierarchically modulated signal, determines the EPRE of the modulated signal of each layer according to the stored power configuration information, and sends the hierarchically modulated signal based on the determined EPRE of the modulated signal of each layer.

In this implementation manner, the power configuration information includes the ratio of only one of the EPRE of the hierarchically modulated signal, the EPRE of the base-layer modulated signal, and the EPRE of the additional-layer modulated signal to the EPRE of the RS on the MBSFN. The network side device may obtain the EPRE of the modulated signal of each layer with reference to the scaling factor α and the ratio, which can reduce an amount of information stored in the network side device, thereby saving storage space.

Second form: The power configuration information includes a ratio of each of EPRE of a base-layer modulated signal and EPRE of an additional-layer modulated signal to EPRE of an RS on an MBSFN.

In this implementation manner, the EPRE of the RS on the MBSFN is known, and the EPRE of the modulated signal of each layer may be determined according to a ratio of the EPRE of the modulated signal of each layer to the EPRE of the RS on the MBSFN.

Similar to the foregoing first implementation manner, in the second implementation manner, the power configuration information may also be preset in a protocol, or configured by the network side device. No matter whether the power configuration information is preset in a protocol or configured by the network side device, the network side device needs to store the preset power configuration information or the power configuration information configured by the network side device, when needing to send the hierarchically modulated signal, determines the EPRE of the modulated signal of each layer according to the stored power configuration information, and sends the hierarchically modulated signal based on the determined EPRE of the modulated signal of each layer.

In this implementation manner, the network side device may directly determine the EPRE of the base-layer modulated signal and the EPRE of the additional-layer modulated signal according to the ratio of each of the EPRE of the base-layer modulated signal and the EPRE of the additional-layer modulated signal to the EPRE of the RS on the MBSFN, which can reduce, compared with the first implementation manner, complexity of determining the EPRE of the base-layer modulated signal and the EPRE of the additional-layer modulated signal, thereby improving efficiency of sending the hierarchically modulated signal.

As described in the foregoing two implementation manners, the power configuration information may be configured by the network side device. When decoding the received hierarchically modulated signal, the UE needs to determine the EPRE of the modulated signal of each layer according to the power configuration information; therefore, the network side device needs to send the configured power configuration information to the UE. Specifically, except the foregoing steps S101 to S103, the method further includes:

configuring the power configuration information of the hierarchical modulation; and sending the power configuration information of the hierarchical modulation to the UE.

In this manner in which the power configuration information is configured and sent by the network side device, the network side device may adjust the configured power configuration information according to an actual requirement, which increases flexibility of the power configuration information.

The network side device sends the power configuration information in multiple manners, for example, in the following several manners:

sending the power configuration information to the UE by using a broadcast control channel (BCCH); or sending the power configuration information to the UE by using a multicast control channel (MCCH); or sending the power configuration information to the UE by using a physical downlink control channel (PDCCH) or an enhanced physical downlink control channel (EPDCCH).

Herein, if the power configuration information is carried in a system information block (SIB) and is sent by using the BCCH, multiple Multimedia Broadcast multicast service Single Frequency Network (MBSFN) areas in LTE base station coverage may share one piece of power configuration information, which reduces a system signaling overhead. If the power configuration information is transmitted by using the MCCH, because each MBSFN area corresponds to one MCCH, the system signaling overhead is relatively high, and this manner is applicable to a case in which different MBSFN areas have different power control information. If the power configuration information is sent by using the PDCCH or the EPDCCH, the system signaling overhead is also relatively high, and this manner is applicable to a case in which different power control information is sent to different cells.

Corresponding to the signal transmission method on the network side described in the foregoing embodiment, after receiving the hierarchically modulated signal sent by the network side device, the UE also needs to determine, according to the power configuration information, the EPRE of the modulated signal of each layer, where the EPRE is required for performing decoding on the received hierarchically modulated signal, which is described in detail below.

Figure 3:
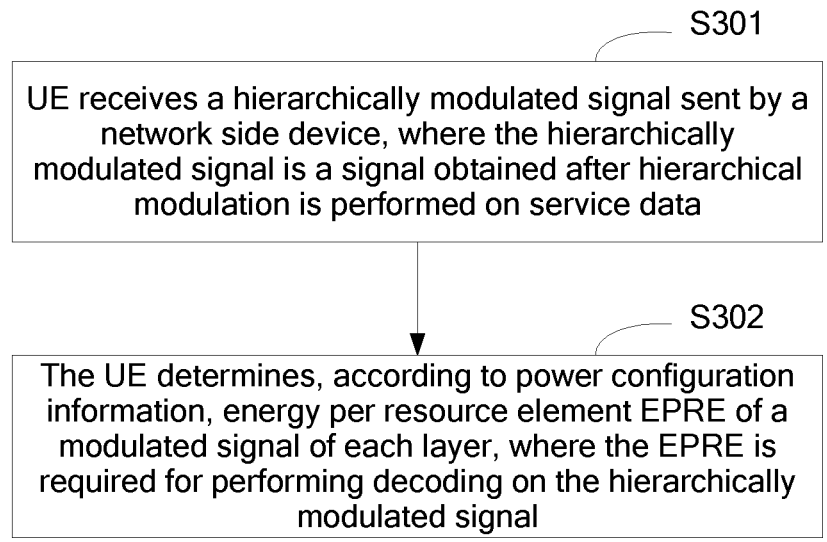
FIG. 3 is a flowchart of a signal transmission method according to Embodiment 2 of the present invention.

FIG. 3 is a flowchart of a signal transmission method according to Embodiment 2 of the present invention, including:

S301. UE receives a hierarchically modulated signal sent by a network side device, where the hierarchically modulated signal is a signal obtained after hierarchical modulation is performed on service data.

S302. The UE determines, according to power configuration information, energy per resource element (EPRE) of a modulated signal of each layer, where the EPRE is required for performing decoding on the hierarchically modulated signal.

Optionally, the service data includes base-layer data and additional-layer data, where a priority of the base-layer data is higher than a priority of the additional-layer data.

The hierarchical modulation includes base-layer modulation and additional-layer modulation, where the base-layer modulation is modulation performed on the base-layer data of the service data, and the additional-layer modulation is modulation performed on the additional-layer data of the service data.

In a specific implementation process, the UE needs to determine EPRE of the hierarchically modulated signal, and decodes the received hierarchically modulated signal according to the EPRE of the hierarchically modulated signal, a transport block size (TBS) index value, an encoding rate, and the like. This embodiment mainly describes a process in which the UE determines the EPRE of the hierarchically modulated signal. The UE may determine the EPRE of the hierarchically modulated signal according to preset power configuration information in a protocol or power configuration information sent by the network side device. A form of the power configuration information may be specifically the following.

First form: The power configuration information includes a ratio of the EPRE of the hierarchically modulated signal to EPRE of an RS on an MBSFN, or a ratio of EPRE of a base-layer modulated signal to the EPRE of the RS on the MBSFN, or a ratio of EPRE of an additional-layer modulated signal to the EPRE of the RS on the MBSFN.

In this implementation manner, the EPRE of the RS on the MBSFN is known; the EPRE of the hierarchically modulated signal may be determined according to the ratio of the EPRE of the hierarchically modulated signal to the EPRE of the RS on the MBSFN, and then the EPRE of the modulated signal of each layer may be determined with reference to a scaling factor α. Likewise, the EPRE of the base-layer modulated signal may be determined according to the ratio of the EPRE of the base-layer modulated signal to the EPRE of the RS on the MBSFN, and then the EPRE of the additional-layer modulated signal may be determined with reference to the scaling factor α; the EPRE of the additional-layer modulated signal may be determined according to the ratio of the EPRE of the additional-layer modulated signal to the EPRE of the RS on the MBSFN, and then the EPRE of the base-layer modulated signal may be determined with reference to the scaling factor α.

The scaling factor α herein may belong to the foregoing power configuration information, or may be independent from the power configuration information. The scaling factor α may be specifically any one of the following ratios:

any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

Herein, the foregoing ratio of the base-layer constellation point spacing to the hierarchical modulation constellation point spacing, the ratio of the additional-layer constellation point spacing to the hierarchical modulation constellation point spacing, and the ratio of the base-layer constellation point spacing to the additional-layer constellation point spacing are referred to as constellation point spacing ratios for short, and the constellation point spacing herein indicates a minimum distance between constellation points. The ratio of the EPRE of the base-layer modulated signal to the EPRE of the hierarchically modulated signal, the ratio of the EPRE of the additional-layer modulated signal to the EPRE of the hierarchically modulated signal, and the ratio of the EPRE of the base-layer modulated signal to the EPRE of the additional-layer modulated signal are referred to as energy ratios for short. The foregoing constellation point spacing ratios and energy ratios are in a correspondence, and the energy ratios may be determined according to the constellation point spacing ratios. For example, for hierarchical modulation with a base layer using a QPSK modulation scheme and an additional layer using a QPSK modulation scheme, when the scaling factor is the ratio of the base-layer constellation point spacing to the hierarchical modulation constellation point spacing, the ratio of the EPRE of the base-layer modulated signal to the EPRE of the additional-layer modulated signal is: $(a+1)^2$. For another example, for hierarchical modulation with the base layer using the QPSK modulation scheme and the additional layer using a 16-QAM modulation scheme, when the scaling factor is the ratio of the base-layer constellation point spacing to the hierarchical modulation constellation point spacing, the ratio of the EPRE of the base-layer modulated signal to the EPRE of the additional-layer modulated signal is: $5\times(a+1)^2$. For another example, for hierarchical modulation with the base layer using the 16-QAM modulation scheme and the additional layer using the QPSK modulation scheme, when the scaling factor is the ratio of the base-layer constellation point spacing to the hierarchical modulation constellation point spacing, the ratio of the EPRE of the base-layer modulated signal to the EPRE of the additional-layer modulated signal is: $[8\times(a+1)^2]/[a^2+(a+2)^2]$.

In this implementation manner, the ratio of the EPRE of the hierarchically modulated signal to the EPRE of the RS on the MBSFN may be 0 dB, that is, the EPRE of the hierarchically modulated signal may be configured as being equal to the EPRE of the RS on the MBSFN; or, the ratio of the EPRE of the base-layer modulated signal to the EPRE of the RS on the MBSFN may be 0 dB, that is, the EPRE of the base-layer modulated signal may be configured as being equal to the EPRE of the RS on the MBSFN; or, the ratio of the EPRE of the additional-layer modulated signal to the EPRE of the RS on the MBSFN may be 0 dB, that is, the EPRE of the additional-layer modulated signal may be configured as being equal to the EPRE of the RS on the MBSFN.

The foregoing power configuration information includes the ratio of only one of the EPRE of the hierarchically modulated signal, the EPRE of the base-layer modulated signal, and the EPRE of the additional-layer modulated signal to the EPRE of the RS on the MBSFN. The UE needs to obtain the EPRE of the modulated signal of each layer with reference to the scaling factor $\alpha$. Herein, the scaling factor $\alpha$ is a mandatory parameter required by the network side device for performing modulation on the hierarchically modulated signal. Therefore, a network side needs to store a value of the scaling factor $\alpha$ regardless of whether reference needs to be made to the scaling factor $\alpha$ to obtain the EPRE of the modulated signal of each layer.

In the foregoing implementation manner, the power configuration information may be preset in a protocol, or sent by the network side device. No matter whether the power configuration information is preset in a protocol or sent by the network side device, the UE needs to store the preset power configuration information or the power configuration information sent by the network side device, and when needing to demodulate the received hierarchically modulated signal, determines the EPRE of the modulated signal of each layer according to the stored power configuration information.

In this implementation manner, the power configuration information includes the ratio of only one of the EPRE of the hierarchically modulated signal, the EPRE of the base-layer modulated signal, and the EPRE of the additional-layer modulated signal to the EPRE of the RS on the MBSFN. The UE may obtain the EPRE of the modulated signal of each layer with reference to the scaling factor $\alpha$ and the ratio, which can reduce an amount of information stored in the UE, thereby saving storage space.

Second form: The power configuration information includes a ratio of each of EPRE of a base-layer modulated signal and EPRE of an additional-layer modulated signal to EPRE of an RS on an MBSFN.

In this implementation manner, the EPRE of the RS on the MBSFN is known, and the EPRE of the modulated signal of each layer may be determined according to a ratio of the EPRE of the modulated signal of each layer to the EPRE of the RS on the MBSFN.

Similar to the foregoing first implementation manner, in the second implementation manner, the power configuration information may also be preset in a protocol, or sent by the network side device. No matter whether the power configuration information is preset in a protocol or sent by the network side device, the UE needs to store the preset power configuration information or the power configuration information sent by the network side device, and when needing to demodulate the received hierarchically modulated signal, determines the EPRE of the modulated signal of each layer according to the stored power configuration information.

In this implementation manner, the UE may directly determine the EPRE of the base-layer modulated signal and the EPRE of the additional-layer modulated signal according to the ratio of each of the EPRE of the base-layer modulated signal and the EPRE of the additional-layer modulated signal to the EPRE of the RS on the MBSFN, which can reduce, compared with the first implementation manner, complexity of determining the EPRE of the base-layer modulated signal and the EPRE of the additional-layer modulated signal, thereby improving efficiency of demodulating the hierarchically modulated signal.

As described in the foregoing two implementation manners, the power configuration information may be sent by the network side device to the UE. Corresponding to the manner in which the power configuration information is sent to the UE by the network side device described in Embodiment 1, the UE may receive the power configuration information sent by the network side device in the following several manners:

receiving the power configuration information by using a broadcast control channel (BCCH); or receiving the power configuration information by using a multicast control channel (MCCH); or receiving the power configuration information by using a physical downlink control channel (PDCCH) or an enhanced physical downlink control channel (EPDCCH).

Based on a same invention concept, an embodiment of the present invention further provides a signal transmission apparatus corresponding to the signal transmission method. Because a theory for resolving a problem by the signal transmission apparatus in this embodiment of the present invention is similar to that of the signal transmission method in the embodiments of the present invention, for implementation of the apparatus in the embodiment of the present invention, reference may be made to implementation of the method, and no repeated description is provided.

Figure 4:
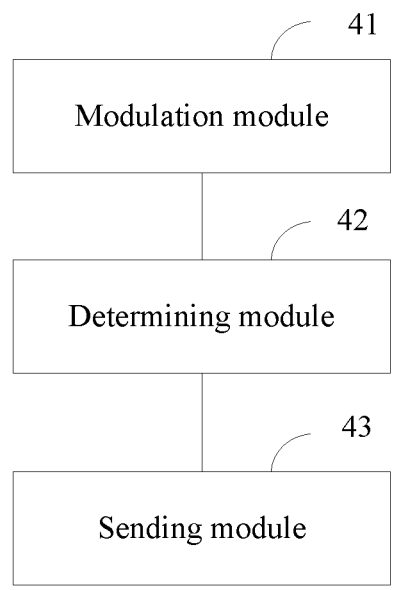
FIG. 4 is a schematic structural diagram of a signal transmission apparatus according to Embodiment 3 of the present invention.

FIG. 4 is a schematic structural diagram of a signal transmission apparatus according to Embodiment 3 of the present invention, including:

a modulation module 41, configured to perform hierarchical modulation on service data that needs to be sent, so as to obtain a hierarchically modulated signal;

a determining module 42, configured to determine energy per resource element (EPRE) of a modulated signal of each layer according to power configuration information of the hierarchical modulation; and a sending module 43, configured to send the hierarchically modulated signal to user equipment UE according to the EPRE, determined by the determining module 42, of the modulated signal of each layer.

Optionally, the service data includes base-layer data and additional-layer data, where a priority of the base-layer data is higher than a priority of the additional-layer data.

The hierarchical modulation includes base-layer modulation and additional-layer modulation, where the base-layer modulation is modulation performed on the base-layer data of the service data, and the additional-layer modulation is modulation performed on the additional-layer data of the service data.

Optionally, the power configuration information includes:
a ratio of EPRE of the hierarchically modulated signal to EPRE of a reference signal (RS) on a Multimedia Broadcast multicast service Single Frequency Network (MBSFN); or a ratio of EPRE of a base-layer modulated signal to EPRE of an RS on an MBSFN; or a ratio of EPRE of an additional-layer modulated signal to EPRE of an RS on an MBSFN.

Optionally, the power configuration information includes:
the ratio of the EPRE of the hierarchically modulated signal to the EPRE of the RS on the MBSFN is 0 dB; or the ratio of the EPRE of the base-layer modulated signal to the EPRE of the RS on the MBSFN is 0 dB; or the ratio of the EPRE of the additional-layer modulated signal to the EPRE of the RS on the MBSFN is 0 dB.

Optionally, the power configuration information further includes:
any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

Optionally, the power configuration information includes:
a ratio of each of EPRE of a base-layer modulated signal and EPRE of an additional-layer modulated signal to EPRE of an RS on an MBSFN.

Optionally, the sending module 43 is further configured to:
configure the power configuration information of the hierarchical modulation, and send the power configuration information of the hierarchical modulation to the UE.

Optionally, the sending module 43 is specifically configured to:
send the power configuration information to the UE by using a broadcast control channel (BCCH); or send the power configuration information to the UE by using a multicast control channel (MCCH); or send the power configuration information to the UE by using a physical downlink control channel (PDCCH) or an enhanced physical downlink control channel (EPDCCH).

Figure 5:
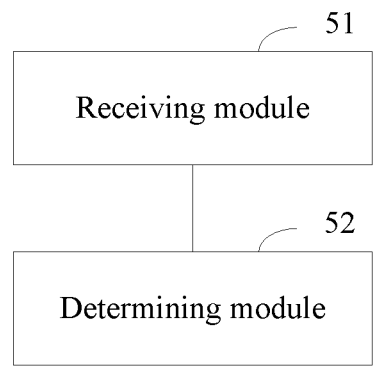
FIG. 5 is a schematic structural diagram of a signal transmission apparatus according to Embodiment 4 of the present invention.

FIG. 5 is a schematic structural diagram of a signal transmission apparatus according to Embodiment 4 of the present invention, including:

a receiving module 51, configured to receive a hierarchically modulated signal sent by a network side device, where the hierarchically modulated signal is a signal obtained after hierarchical modulation is performed on service data; and a determining module 52, configured to determine, according to power configuration information, energy per resource element (EPRE) of a modulated signal of each layer, where the EPRE is required for performing decoding on the hierarchically modulated signal received by the receiving module 51.

Optionally, the service data includes base-layer data and additional-layer data, where a priority of the base-layer data is higher than a priority of the additional-layer data.

The hierarchical modulation includes base-layer modulation and additional-layer modulation, where the base-layer modulation is modulation performed on the base-layer data of the service data, and the additional-layer modulation is modulation performed on the additional-layer data of the service data.

Optionally, the power configuration information includes:
a ratio of EPRE of the hierarchically modulated signal to EPRE of a reference signal (RS) on a Multimedia Broadcast multicast service Single Frequency Network (MBSFN); or a ratio of EPRE of a base-layer modulated signal to EPRE of an RS on an MBSFN; or a ratio of EPRE of an additional-layer modulated signal to EPRE of an RS on an MBSFN.

Optionally, the power configuration information includes:
the ratio of the EPRE of the hierarchically modulated signal to the EPRE of the RS on the MBSFN is 0 dB; or the ratio of the EPRE of the base-layer modulated signal to the EPRE of the RS on the MBSFN is 0 dB; or the ratio of the EPRE of the additional-layer modulated signal to the EPRE of the RS on the MBSFN is 0 dB.

Optionally, the power configuration information further includes:
any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

Optionally, the power configuration information includes a ratio of each of EPRE of a base-layer modulated signal and EPRE of an additional-layer modulated signal to EPRE of an RS on an MBSFN.

Optionally, the determining module 52 is specifically configured to:

determine the EPRE of the modulated signal of each layer according to preset power configuration information; or receive power configuration information sent by the network side device, and determine the EPRE of the modulated signal of each layer according to the received power configuration information.

Optionally, the receiving module 51 is specifically configured to: receive the power configuration information by using a broadcast control channel (BCCH); or receive the power configuration information by using a multicast control channel (MCCH); or receive the power configuration information by using a physical downlink control channel (PDCCH) or an enhanced physical downlink control channel (EPDCCH).

Figure 6:
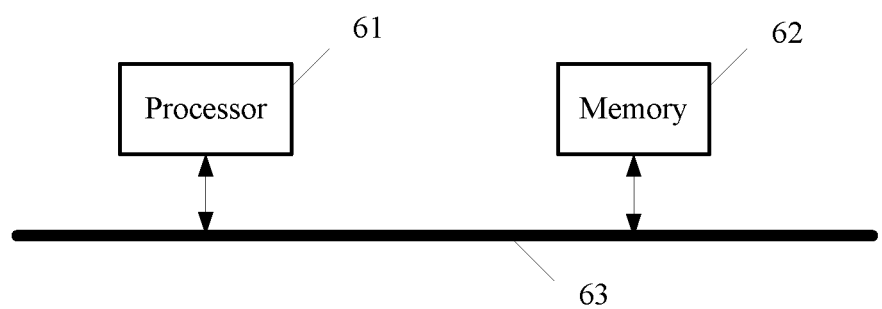
FIG. 6 is a schematic structural diagram of a signal transmission apparatus according to Embodiment 5 of the present invention.

FIG. 6 is a schematic structural diagram of a signal transmission apparatus according to Embodiment 5 of the present invention, including: a processor 61, a memory 62, and a bus 63, where the memory 62 stores an execution instruction; when the apparatus runs, the processor 61 communicates with the memory 62 by using the bus 63, and the processor 61 executes the execution instruction, so that the apparatus executes the following method:

performing hierarchical modulation on service data that needs to be sent, so as to obtain a hierarchically modulated signal;

determining energy per resource element (EPRE) of a modulated signal of each layer according to power configuration information of the hierarchical modulation; and sending the hierarchically modulated signal to user equipment UE according to the determined EPRE of the modulated signal of each layer.

Optionally, the service data includes base-layer data and additional-layer data, where a priority of the base-layer data is higher than a priority of the additional-layer data.

The hierarchical modulation includes base-layer modulation and additional-layer modulation, where the base-layer modulation is modulation performed on the base-layer data of the service data, and the additional-layer modulation is modulation performed on the additional-layer data of the service data.

Optionally, the power configuration information includes:

a ratio of EPRE of the hierarchically modulated signal to EPRE of a reference signal (RS) on a Multimedia Broadcast multicast service Single Frequency Network (MBSFN); or a ratio of EPRE of a base-layer modulated signal to EPRE of an RS on an MBSFN; or a ratio of EPRE of an additional-layer modulated signal to EPRE of an RS on an MBSFN.

Optionally, the power configuration information includes:

the ratio of the EPRE of the hierarchically modulated signal to the EPRE of the RS on the MBSFN is 0 dB; or the ratio of the EPRE of the base-layer modulated signal to the EPRE of the RS on the MBSFN is 0 dB; or the ratio of the EPRE of the additional-layer modulated signal to the EPRE of the RS on the MBSFN is 0 dB.

Optionally, the power configuration information further includes:

any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

Optionally, the power configuration information includes:

a ratio of each of EPRE of a base-layer modulated signal and EPRE of an additional-layer modulated signal to EPRE of an RS on an MBSFN.

Optionally, the method executed by the processor 61 further includes:

configuring the power configuration information of the hierarchical modulation; and sending the power configuration information of the hierarchical modulation to the UE.

Optionally, in the method executed by the processor 61, the sending the power configuration information of the hierarchical modulation to the UE includes:

sending the power configuration information to the UE by using a broadcast control channel (BCCH); or sending the power configuration information to the UE by using a multicast control channel (MCCH); or sending the power configuration information to the UE by using a physical downlink control channel (PDCCH) or an enhanced physical downlink control channel (EPDCCH).

Figure 7:
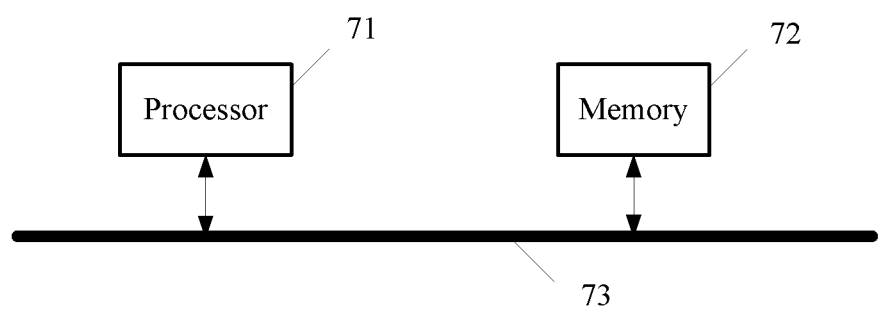
FIG. 7 is a schematic structural diagram of a signal transmission apparatus according to Embodiment 6 of the present invention.

FIG. 7 is a schematic structural diagram of a signal transmission apparatus according to Embodiment 6 of the present invention, including: a processor 71, a memory 72, and a bus 73, where the memory 72 stores an execution instruction; when the apparatus runs, the processor 71 communicates with the memory 72 by using the bus 73, and the processor 71 executes the execution instruction, so that the apparatus executes the following method:

receiving a hierarchically modulated signal sent by a network side device, where the hierarchically modulated signal is a signal obtained after hierarchical modulation is performed on service data; and determining, according to power configuration information, energy per resource element (EPRE) of a modulated signal of each layer, where the EPRE is required for performing decoding on the hierarchically modulated signal.

Optionally, the service data includes base-layer data and additional-layer data, where a priority of the base-layer data is higher than a priority of the additional-layer data.

The hierarchical modulation includes base-layer modulation and additional-layer modulation, where the base-layer modulation is modulation performed on the base-layer data of the service data, and the additional-layer modulation is modulation performed on the additional-layer data of the service data.

Optionally, the power configuration information includes:

a ratio of EPRE of the hierarchically modulated signal to EPRE of a reference signal (RS) on a Multimedia Broadcast multicast service Single Frequency Network (MBSFN); or a ratio of EPRE of a base-layer modulated signal to EPRE of an RS on an MBSFN; or a ratio of EPRE of an additional-layer modulated signal to EPRE of an RS on an MBSFN.

Optionally, the power configuration information includes:

the ratio of the EPRE of the hierarchically modulated signal to the EPRE of the RS on the MBSFN is 0 dB; or the ratio of the EPRE of the base-layer modulated signal to the EPRE of the RS on the MBSFN is 0 dB; or the ratio of the EPRE of the additional-layer modulated signal to the EPRE of the RS on the MBSFN is 0 dB.

Optionally, the power configuration information further includes:

any one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

Optionally, the power configuration information includes a ratio of each of EPRE of a base-layer modulated signal and EPRE of an additional-layer modulated signal to EPRE of an RS on an MBSFN.

Optionally, in the method executed by the processor 71, the determining, according to power configuration information, EPRE of a modulated signal of each layer, where the EPRE is required for performing decoding on the hierarchically modulated signal includes:

determining the EPRE of the modulated signal of each layer according to preset power configuration information; or receiving power configuration information sent by the network side device, and determining the EPRE of the modulated signal of each layer according to the received power configuration information.

Optionally, in the method executed by the processor 71, the receiving power configuration information sent by the network side device includes:

receiving the power configuration information by using a broadcast control channel (BCCH); or receiving the power configuration information by using a multicast control channel (MCCH); or receiving the power configuration information by using a physical downlink control channel (PDCCH) or an enhanced physical downlink control channel (EPDCCH).

It may be clearly understood by a person skilled in the art that, for a purpose of convenient and brief description, only the foregoing functional module division is used as an example for description. In an actual application, the foregoing functions are assigned to different functional modules for implementation as required, that is, an inner structure of the apparatus is divided into different functional modules to implement all or some of the functions described above. For a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributable to the prior art, or all or a part of the technical solutions may be implemented in the form of a software product. The software product may be stored in a storage medium and include several instructions for instructing a computer device (which may be a personal computer, a server, or a network device) or a processor (processor) to perform all or a part of the steps of the methods described in the embodiments of the present application. The foregoing storage medium may include: any medium that can store program code, such as a Universal Serial Bus (USB) flash drive, a removable hard disk, a read-only memory (ROM), a random access memory (RAM), a magnetic disk, or an optical disc.

The foregoing embodiments are merely used for describing the technical solutions in the present application in detail. However, the descriptions of the foregoing embodiments are merely intended to help understand the methods and core ideas of the present invention, but shall not be construed as a limitation to the present invention. Any variation or replacement readily figured out by a person skilled in the art within the technical scope disclosed in the present invention shall fall within the protection scope of the present invention.

What is claimed is:

1. A signal transmission apparatus, comprising:
    a processor coupled to a non-transitory computer readable memory including computer-executable instructions executed by the processor to execute the instructions to perform operations comprising:
    performing hierarchical modulation on service data that needs to be sent, so as to obtain a hierarchically modulated signal;
    determining energy per resource element (EPRE) of a modulated signal of each layer of the service data according to power configuration information of the hierarchical modulation; and
    sending the hierarchically modulated signal to user equipment (UE) according to the determined EPRE of the modulated signal of each layer of the service data.

2. The apparatus according to claim 1, wherein:
    the service data comprises base-layer data and additional-layer data, wherein a priority of the base-layer data is higher than a priority of the additional-layer data; and
    the hierarchical modulation comprises base-layer modulation and additional-layer modulation, wherein the base-layer modulation is modulation performed on the base-layer data of the service data, and the additional-layer modulation is modulation performed on the additional-layer data of the service data.

3. The apparatus according to claim 1, wherein the power configuration information comprises:
a ratio of EPRE of the hierarchically modulated signal to EPRE of a reference signal (RS) on a Multimedia Broadcast multicast service Single Frequency Network (MBSFN);
a ratio of EPRE of a base-layer modulated signal to EPRE of an RS on an MBSFN; or
a ratio of EPRE of an additional-layer modulated signal to EPRE of an RS on an MBSFN.

4. The apparatus according to claim 3, wherein:
the ratio of the EPRE of the hierarchically modulated signal to the EPRE of the RS on the MBSFN is 0 dB;
the ratio of the EPRE of the base-layer modulated signal to the EPRE of the RS on the MBSFN is 0 dB; or
the ratio of the EPRE of the additional-layer modulated signal to the EPRE of the RS on the MBSFN is 0 dB.

5. The apparatus according to claim 3, wherein the power configuration information further comprises:
at least one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

6. The apparatus according to claim 1, wherein the power configuration information comprises:
a ratio of EPRE of a base-layer modulated signal to EPRE of an RS on an MBSFN; and
a ratio of EPRE of an additional-layer modulated signal to EPRE of an RS on an MBSFN.

7. The apparatus according to claim 1, wherein the operations further comprise:
configuring the power configuration information of the hierarchical modulation; and
sending the power configuration information of the hierarchical modulation to the UE.

8. The apparatus according to claim 7, wherein operations further comprise:
sending the power configuration information to the UE by using an enhanced physical downlink control channel (EPDCCH).

9. A signal receiving apparatus, comprising:
a processor coupled to a non-transitory computer-readable memory including computer-executable instructions executed by the processor to execute the instructions to perform operations comprising:
receiving a hierarchically modulated signal sent by a network side device, wherein the hierarchically modulated signal is a signal obtained after hierarchical modulation is performed on service data; and
determining, according to power configuration information, energy per resource element (EPRE) of a modulated signal of each layer of the service data, wherein the EPRE is required for performing decoding on the received hierarchically modulated signal.

10. The apparatus according to claim 9, wherein:
the service data comprises base-layer data and additional-layer data, wherein a priority of the base-layer data is higher than a priority of the additional-layer data; and
the hierarchical modulation comprises base-layer modulation and additional-layer modulation, wherein the base-layer modulation is modulation performed on the base-layer data of the service data, and the additional-layer modulation is modulation performed on the additional-layer data of the service data.

11. The apparatus according to claim 9, wherein the power configuration information comprises:
a ratio of EPRE of the hierarchically modulated signal to EPRE of a reference signal (RS) on a Multimedia Broadcast multicast service Single Frequency Network (MBSFN);
a ratio of EPRE of a base-layer modulated signal to EPRE of an RS on an MBSFN; or
a ratio of EPRE of an additional-layer modulated signal to EPRE of an RS on an MBSFN.

12. The apparatus according to claim 11, wherein:
the ratio of the EPRE of the hierarchically modulated signal to the EPRE of the RS on the MBSFN is 0 dB;
the ratio of the EPRE of the base-layer modulated signal to the EPRE of the RS on the MBSFN is 0 dB; or
the ratio of the EPRE of the additional-layer modulated signal to the EPRE of the RS on the MBSFN is 0 dB.

13. The apparatus according to claim 11, wherein the power configuration information further comprises:
at least one of the following six ratios: a ratio of a base-layer constellation point spacing to a hierarchical modulation constellation point spacing, a ratio of an additional-layer constellation point spacing to a hierarchical modulation constellation point spacing, a ratio of a base-layer constellation point spacing to an additional-layer constellation point spacing, a ratio of the EPRE of the base-layer modulated signal to the EPRE of the hierarchically modulated signal, a ratio of the EPRE of the additional-layer modulated signal to the EPRE of the hierarchically modulated signal, or a ratio of the EPRE of the base-layer modulated signal to the EPRE of the additional-layer modulated signal.

14. The apparatus according to claim 9, wherein the power configuration information comprises:
a ratio of each of EPRE of a base-layer modulated signal to EPRE of an RS on an MBSFN; and
a ratio of EPRE of an additional-layer modulated signal to EPRE of an RS on an MBSFN.

15. The apparatus according to claim 9, wherein the operations further comprise:
receiving power configuration information sent by the network side device; and determining the EPRE of the modulated signal of each layer of the service data according to the received power configuration information.

16. The apparatus according to claim 15, wherein the operations further comprise:
receiving the power configuration information by using an enhanced physical downlink control channel (EPDCCH).

17. A signal transmission method, comprising:
performing, by a network side device, hierarchical modulation on service data that needs to be sent, so as to obtain a hierarchically modulated signal;
determining, by the network side device, energy per resource element (EPRE) of a modulated signal of each layer of the service data according to power configuration information of the hierarchical modulation; and sending, by the network side device, the hierarchically modulated signal to user equipment (UE) according to the determined EPRE of the modulated signal of each layer of the service data.

18. The method according to claim 17, wherein:

the service data comprises base-layer data and additional-layer data, wherein a priority of the base-layer data is higher than a priority of the additional-layer data; and the hierarchical modulation comprises base-layer modulation and additional-layer modulation, wherein the base-layer modulation is modulation performed on the base-layer data of the service data, and the additional-layer modulation is modulation performed on the additional-layer data of the service data.

19. The method according to claim 17, wherein the power configuration information comprises:

a ratio of EPRE of the hierarchically modulated signal to EPRE of a reference signal (RS) on a Multimedia Broadcast multicast service Single Frequency Network (MBSFN);

a ratio of EPRE of a base-layer modulated signal to EPRE of an RS on an MBSFN; or a ratio of EPRE of an additional-layer modulated signal to EPRE of an RS on an MBSFN.

20. The method according to claim 19, wherein:

the ratio of the EPRE of the hierarchically modulated signal to the EPRE of the RS on the MBSFN is 0 dB;

the ratio of the EPRE of the base-layer modulated signal to the EPRE of the RS on the MBSFN is 0 dB; or the ratio of the EPRE of the additional-layer modulated signal to the EPRE of the RS on the MBSFN is 0 dB.

* * * * *